(12) United States Patent
Maguire

(10) Patent No.: US 8,441,496 B1
(45) Date of Patent: May 14, 2013

(54) METHOD AND SYSTEM FOR MODIFYING AND RENDERING SCENES VIA DISPLAY LISTS

(75) Inventor: Mark E. Maguire, Woburn, MA (US)

(73) Assignee: Adobe Systems Incorporated, San Jose, CA (US)

( * ) Notice: Subject to any disclaimer, the term of this patent is extended or adjusted under 35 U.S.C. 154(b) by 808 days.

(21) Appl. No.: 12/242,537

(22) Filed: Sep. 30, 2008

(51) Int. Cl.
| | | |
|---|---|---|
| G06T 11/001 | (2006.01) | |
| G06T 19/00 | (2011.01) | |
| G06T 15/40 | (2011.01) | |
| G06T 15/20 | (2011.01) | |
| G09G 5/363 | (2006.01) | |

(52) U.S. Cl.
USPC ........... 345/581; 345/419; 345/421; 345/427; 345/502

(58) Field of Classification Search .................. None
See application file for complete search history.

(56) References Cited

U.S. PATENT DOCUMENTS

| 5,058,042 A * | 10/1991 | Hanna et al. ................. 345/427 |
|---|---|---|
| 5,719,598 A | 2/1998 | Latham |
| 6,008,820 A | 12/1999 | Chauvin et al. |
| 6,603,474 B1 | 8/2003 | Cobb et al. |
| 7,577,294 B2 * | 8/2009 | Toyama et al. ............... 382/173 |
| 2008/0298697 A1 * | 12/2008 | Lee .............................. 382/243 |
| 2009/0100366 A1 * | 4/2009 | Fitzmaurice et al. .......... 715/767 |

OTHER PUBLICATIONS

Cohen, M. F., Greenberg, D. P., Immel D.S. and Brock, P. J., "An Efficient Radiosity Approach for Realistic Image Synthesis," IEEE Computer Graphics and Applications, vol. 6, Issue 3, pp. 26-35, Mar. 1986.*

* cited by examiner

Primary Examiner — Kee M Tung
Assistant Examiner — Sing-Wai Wu
(74) Attorney, Agent, or Firm — Wolfe-SBMC

(57) ABSTRACT

Various embodiments of a method and system for modifying and rendering scenes via display lists are described. Various embodiments may include a graphical application for generating a display list including display list nodes each corresponding to a respective scene element. To generate a given display list node, the graphical application may determine a scene graph node of a scene graph, allocate a portion of memory dedicated to the display list node, and store in that portion of memory, at least one of the attributes of the respective scene element determined from the particular scene graph node. The graphical application may modify a particular display list node corresponding to the particular scene element by modifying a respective attribute stored in the portion of memory allocated to the particular display list node, and render an image of a scene that includes the particular scene element modified according to the notification.

21 Claims, 7 Drawing Sheets

METHOD AND SYSTEM FOR MODIFYING AND RENDERING SCENES VIA DISPLAY LISTS

BACKGROUND

1. Field of the Invention

The present invention is directed to computer systems. More particularly, it is directed to modifying and rendering three dimensional scenes in computing environments.

2. Description of the Related Art

Computer systems can be used to generate representations of three dimensional scenes. Three dimensional scenes (or "worlds") may include various objects arranged at specified positions within the scene. Examples of such objects include geometry objects, light objects, camera objects or other objects that may be represented in a three dimensional space. In many cases, objects may include properties such as position, orientation, color, texture, intensity (e.g., for light objects), and/or other properties that may be represented as part of a three dimensional scene. Three dimensional scenes may be created in a variety of computing applications, such as computer-aided design (CAD) applications and three dimensional animation applications. Such application can be utilized for a wide variety of purposes, such as generating a three dimensional representation of architectural plans or generating an animated motion picture. To represent three dimensional scenes in two dimensional form (e.g., on an electronic display), such scenes may be rendered from a particular viewing (or "view") frustum, which specifies the point of view from which the scene is rendered.

SUMMARY

Various embodiments of a method and system for modifying and rendering scenes via display lists are described. Various embodiments may include a scene graph that includes multiple scene graph nodes. Various embodiments may also include the generation of a display list. In some embodiments, a display list may be an optimized version of a corresponding scene graph. Such display list may be represented by a tree data structure including one or more parent nodes and corresponding child nodes. In various embodiments, memory space for a display list may be allocated at load time (e.g., when a source graphics file is loaded by a graphical application). In various embodiments, a separate portion of memory may be dedicated to each display list node of the display list.

Whereas conventional systems might link display list nodes as part of a rendering process, the graphical application described herein may in various embodiments link display list nodes (e.g., in a linked list or other linking data structure) independently with respect to the rendering process. For instance, in some cases, the display list nodes of the display list may be linked at load time and one or more images may be subsequently rendered from such linked display list. Furthermore, conventional systems may perform a scene modification (e.g., a modification to any element of the scene, e.g., a color change applied to an object) by modifying the corresponding scene graph, generating a new display list, linking the new display list, and rendering from the new display list an image of the scene including the scene modification.

Various embodiments described herein may include performing a scene modification by directly modifying the original display list (e.g., without modifying the corresponding scene graph) and rendering from the display list an image of the scene including the scene modification. In various embodiments, directly modifying the original display list may include modifying one or more attributes of a display list node. As described above, a particular portion of memory may be dedicated to a particular display list node. To perform a modification to a scene element to which that particular display list node corresponds, various embodiments may include replacing the value of an attribute stored in the display list node's dedicated portion of memory with a new value for the attribute. An image of the modified scene including the modified scene element may be rendered from the modified display list. Such rendering may be performed without allocating additional memory for the display list and/or without modifying the scene graph. In various embodiments, the scene graph may be modified to reflect such a scene modification; however, such modification to the scene graph may be performed asynchronously with respect to the rendering process.

Figure 1:
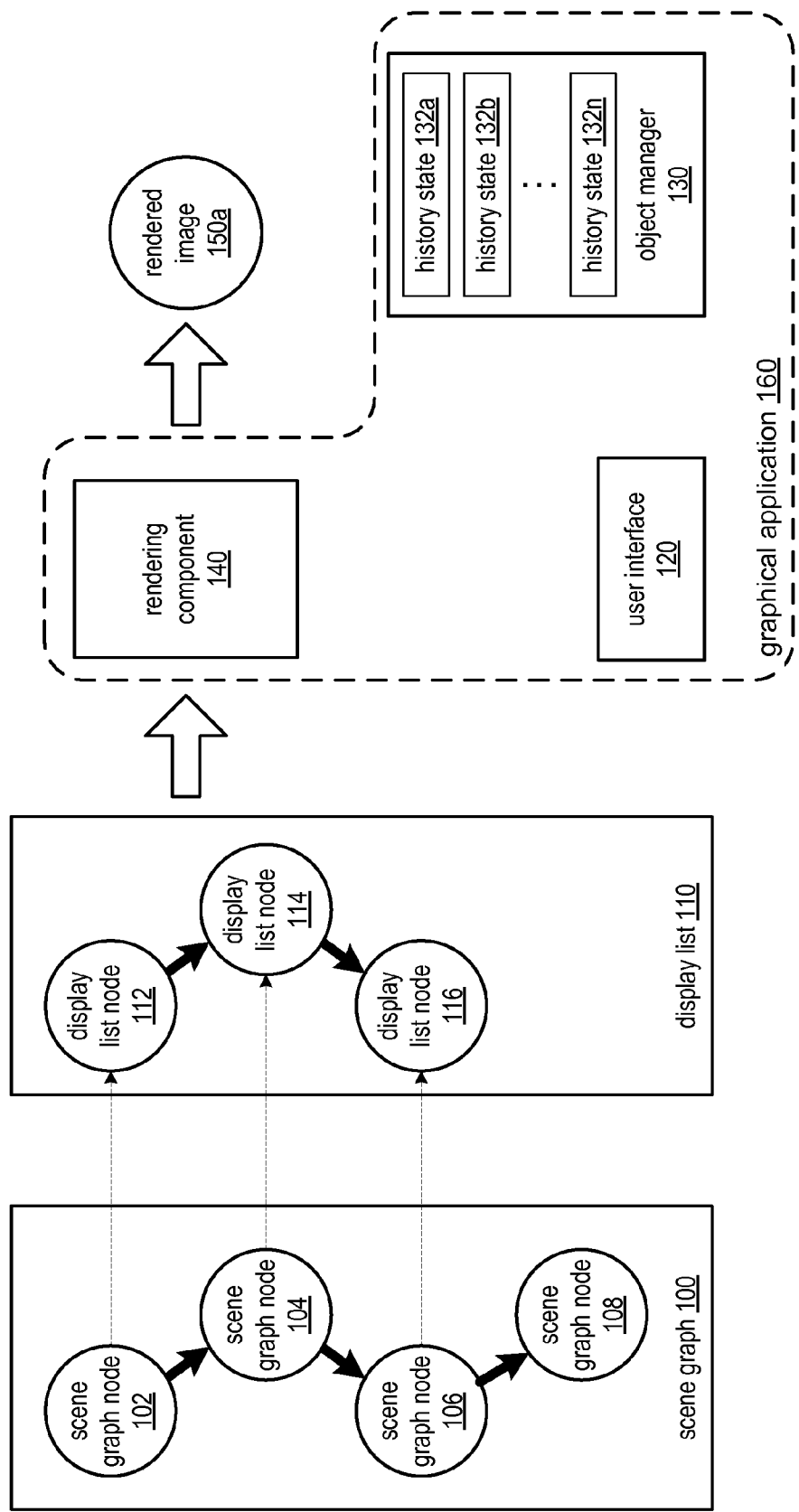
FIG. 1 illustrates a logical representation of various elements of the method and system for modifying and rendering scenes via display lists, according to some embodiments.

While the method and system for modifying and rendering scenes via display lists is described herein by way of example for several embodiments and illustrative drawings, those skilled in the art will recognize that the method and system for modifying and rendering scenes via display lists is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and system for modifying and rendering scenes via display lists as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and system for modifying and rendering scenes via display lists are described. Various embodiments may include a scene graph that includes multiple scene graph nodes. In some cases, such scene graph may be represented by a tree data structure including one or more parent nodes and corresponding child nodes. Each of such nodes may represent an element (or "object") of a three dimensional scene. For example, a given node in the scene graph may represent a geometry object, a light object, a camera object or another object that may be represented in a three dimensional space. In many cases, objects may include attributes such as position, orientation, color, texture, intensity (e.g., for light objects), and/or other attributes that may be represented as part of a three dimensional scene. While the description presented herein may largely describe various embodiments in terms of tree data structures, any data structure suitable for representing a three dimensional scene may be utilized in various embodiments. In some embodiments, a scene graph may be generated from a data file representing a three dimensional scene, such as a data file generated from a three dimensional CAD application. In various embodiments, scene graphs may be generated by a graphical application and stored in memory, such as random access memory (RAM). In general, a graphical application may include any application configured to render an image (or other two dimensional representation) of a three dimensional scene. In various embodiments, graphical applications may include a rendering component to perform a portion or all of the rendering duties of the application. To perform rendering duties, such graphical application may in some cases utilize a graphics application programming interface (API) and/or graphics hardware (e.g., a graphics processing unit (GPU)). In various embodiments, rendering may include real-time rendering or offline rendering.

Various embodiments may also include the generation of a display list. In some embodiments, a display list may be an optimized version of a corresponding scene graph. Accordingly, such display list may also be represented by a tree data structure including one or more parent nodes and corresponding child nodes. In various embodiments, a three dimensional scene may be rendered from the viewpoint of a camera object, which defines a point of view or view frustum for a given three dimensional scene. Accordingly, the display list may in various embodiments be optimized by excluding nodes that are positioned outside of the view frustum. Additionally, the display list may in various embodiments be optimized by excluding hidden nodes (i.e., nodes positioned within the view frustum that are not visible due to a viewing obstruction, such as a larger element in the scene). Display lists may also be optimized by sorting faces of geometrical objects to minimize switching between different materials at render time (which may conserve processing time/power). As is the case with scene graphs, display lists may be generated by the aforementioned graphical application and stored in memory, such as RAM. In various embodiments, memory space for a display list may be allocated at load time (i.e., when the source graphics file is loaded by the graphical application). In various embodiments, a separate portion of memory may be dedicated to each display list node of the display list.

Whereas conventional systems might link display list nodes as part of a rendering process, the graphical application described herein may in various embodiments link display list nodes (e.g., in a linked list or other linking data structure) independently with respect to the rendering process. For instance, in some cases, the display list nodes of the display list may be linked at load time and one or more images may be subsequently rendered from such linked display list. Furthermore, conventional systems may perform a scene modification (e.g., a modification to any element of the scene, e.g., a color change applied to an object) by modifying the corresponding scene graph, generating a new display list, linking the new display list, and rendering from the new display list an image of the scene including the scene modification. Various embodiments described herein may perform a scene modification by directly modifying the original display list (e.g., without modifying the corresponding scene graph) and rendering from the display list an image of the scene including the scene modification. In various embodiments, directly modifying the original display list may include modifying one or more attributes of a display list node. As described above, a particular portion of memory may be dedicated to a particular display list node. To perform a modification to a scene element to which that particular display list node corresponds, various embodiments may include replacing the value of an attribute stored in the display list node's dedicated portion of memory with a new value for the attribute. For example, to change a color of a particular scene element, a color code of a color attribute stored in the corresponding display list node's dedicated portion of memory may be replaced with a new color code. An image of the modified scene including the scene element colored according to its new color code may be rendered from the modified display list. Such rendering may be performed without allocating additional memory for the display list and/or without modifying the scene graph. In various embodiments, the scene graph may be modified to reflect such a scene modification; however, such modification to the scene graph may be performed asynchronously with respect to the rendering process.

In various embodiments, an object manager may manage multiple history states of a scene. The various history states may specify the state of a scene at a given point in time. In various embodiments, each history state may correspond to a respective scene modification. For example, a particular scene modification might include changing the color of a light element from red to green. The corresponding history state for this scene modification may specify such color change. For instance, the history state may be a record indicating a particular change in a particular attribute of a scene element. For the example of a color change to a particular scene element, the corresponding history state may include an identifier of the scene element (e.g., a pointer to the memory space in which the corresponding display list node resides), an identifier of a particular attribute that was changed (e.g., a color attribute), the value from which the attribute was changed (e.g., the original color code), and/or the value to which the attribute was changed (e.g., the new color code). The object manager described herein may be a component of the aforementioned graphics application in various embodiments. In various cases, the object manager may be responsive to requests to load a particular history state from its records of history states. In some embodiments, such requests may correspond to undo commands (e.g., a command to transition to a previous state) or redo commands (e.g., a request to transition to a future state).

FIG. 1 illustrates a logical representation of various elements of the method and system for modifying and rendering scenes via display lists, according to some embodiments. Various embodiments may include a scene graph 100 that includes multiple scene graph nodes 102-108. While the illustrated embodiment includes only four scene graph nodes for simplicity, scene graph 100 may in other embodiments includes fewer or more scene graph nodes. In some cases, scene graph 100 may be represented by a tree data structure including one or more parent nodes (e.g., scene graph node 102) and corresponding child nodes (e.g., scene graph node 104). Each of scene graph nodes 102-108 may represent an element of a three dimensional scene. For example, a given node in the scene graph may represent a geometry object, a light object, a camera object or another object that may be represented in a three dimensional space. In many cases, objects may include various attributes such as position, orientation, color, hue, saturation, contrast, white levels, texture, intensity (e.g., for light objects), and/or other attributes that may be represented as part of a three dimensional scene. In addition to intensity, light objects may also include attributes such as light type, light position, light target, light color, hotspot angle, falloff angle, and one or more shadow attributes. In various embodiments, camera objects may include various attributes such as camera type, banking angle, lens type, aspect ratio (e.g., ratio of viewing frustum defined by camera), and zoom factor. Various other attributes may be associated with texture maps, materials and one or more meshes.

While scene graph 100 (as well as display list 110) is described with respect to a tree data structure, any data structure suitable for representing a three dimensional scene may be utilized in various embodiments. In some embodiments, scene graph 100 may be generated from a data file representing a three dimensional scene, such as a data file generated from a three dimensional CAD application. In various embodiments, scene graph 100 may be generated by graphical application 160 and stored in memory, such as RAM (such as memory 720 described below with respect to FIG. 7). In general, graphical application 160 may in various embodiments include any application configured to render image 150*a* (or an other two dimensional representation) of the three dimensional scene (or world) defined by scene graph 100. In various embodiments, graphical application 160 may include rendering component 140, which may be configured to perform a portion or all of the rendering duties of application 160. To perform rendering duties, graphical application 160 may in some cases utilize a graphics API and/or graphics hardware (e.g., a GPU). In various embodiments, such rendering may include real-time rendering or offline rendering.

The illustrated embodiment of FIG. 1 also includes display list 110, which may be an optimized version of a scene graph 100. Accordingly, display list 110 may also be represented by a tree data structure including one or more parent nodes (e.g., display list node 112) and corresponding child nodes (e.g., display list node 114). In various embodiments, graphical application 160 may perform rendering from the viewpoint of a camera object, which defines a point of view or view frustum for a given three dimensional scene. Such camera object may be defined by a scene graph node and/or a display list node of FIG. 1. Display list 110 may in various embodiments be optimized by excluding nodes that are positioned outside of the view frustum. For instance, while display list 110 includes nodes 112-116 corresponding respectively to nodes 102-106 of the scene graph, display list 100 does not include a node that corresponds to scene graph node 108. In one example, scene graph node 108 may be a node that corresponds to a scene element that is positioned outside of the aforementioned view frustum. Additionally, display list 100 may in various embodiments be optimized by the exclusion of hidden nodes (i.e., nodes positioned within the view frustum that are not visible due to a viewing obstruction, such as a larger element in the scene); such exclusion may be performed by graphical application 160. For example, scene graph node 108 may correspond to a scene element that is hidden by another object in the view frustum, such as a scene element corresponding to one of display list nodes 112-116. Display list 100 may also be optimized via the sorting of faces of geometrical objects in order to minimize switching between different materials at render time (which may conserve processing cycles and/or power); such sorting may be performed by graphical application 160. As is the case with scene graph 100, display list 110 may be generated by the aforementioned graphical application and stored in memory, such as RAM (such as memory 720 described below with respect to FIG. 7). In various embodiments, memory space for a display list may be allocated at load time (i.e., when the source graphics file from which the scene graph is generated is loaded by the graphical application). In various embodiments, a separate portion of memory may be dedicated to each display list node of the display list.

Whereas conventional graphical applications might link display list nodes as part of a rendering process, graphical application 160 may in various embodiments link display list nodes (e.g., in a linked list or other linking data structure) independently with respect to the rendering process. For instance, in some cases, the display list nodes of the display list may be linked at load time and image 150*a* may (at some later time) be rendered from such linked display list. Graphical application 160 may also include a history object manager, which is described in more detail below with respect to FIGS. 2-4.

Figure 2:
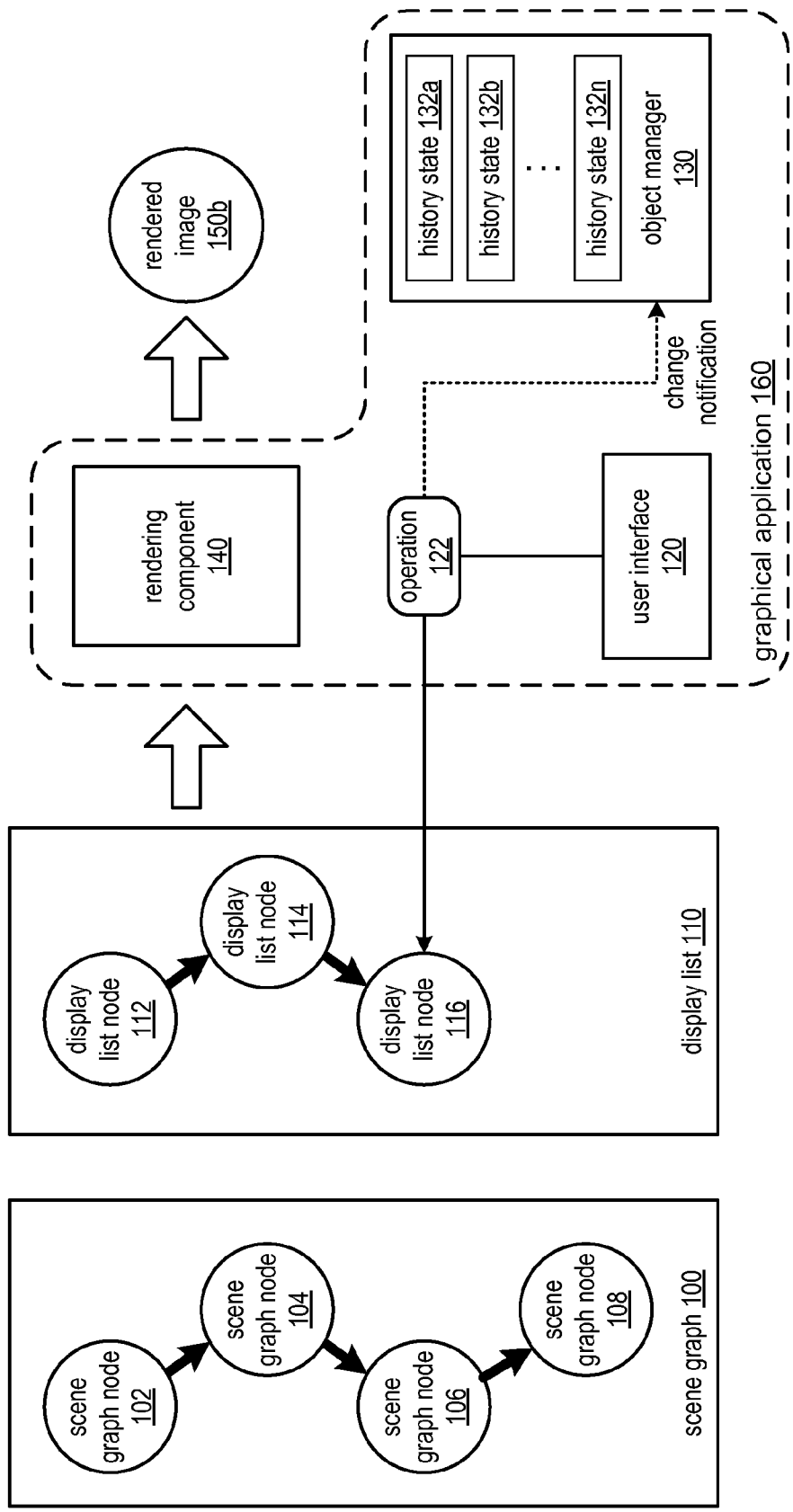
FIG. 2 illustrates the operation of elements of the method and system for modifying and rendering scenes via display lists during a scene modification, according to some embodiments.

FIG. 2 illustrates the operation of elements of the method and system for modifying and rendering scenes via display lists during a scene modification, according to some embodiments. Note that the description presented above with respect to the elements of FIG. 1 also applies to the like-numbered elements of FIG. 2. As illustrated in FIG. 2, user interface 120 may specify an operation 122 to be performed on display list 110. In some cases, user interface 120 may specify such operation in response to user input (e.g., input through a keyboard, a pointing device, such as a mouse or stylus, or some other input device). In other embodiments, user interface 120 may be configured to receive one or more commands (e.g., from a command script) and specify such a command as an operation, such as operation 122. Operation 122 may include a modification of an attribute of a particular display list node. In the illustrated embodiment, operation 122 is performed on display list node 116. However, in other embodiments, operations may be performed on any other node of the display list. In various embodiments, operation 122 may represent a modification of a scene element; application 160 may determine which display list node to modify by selecting the display list node that corresponds to such scene element.

Application 160 may in some embodiments perform a scene modification by directly modifying the original display list (e.g., without modifying the corresponding scene graph and/or generating a new display list in a new memory space) and rendering from the display list image 150*b* of the scene including the scene modification. In various embodiments, directly modifying the original display list may include modifying one or more attributes of a display list node. As described above, a particular portion of memory (e.g., memory 720 described below with respect to FIG. 7) may be dedicated to a particular display list node. To perform a modification to the scene element to which display list node 116 corresponds, application 160 may be configured to replace the value of an attribute stored in the display list node 116's dedicated portion of memory with a new value for the attribute.

Figure 3A:
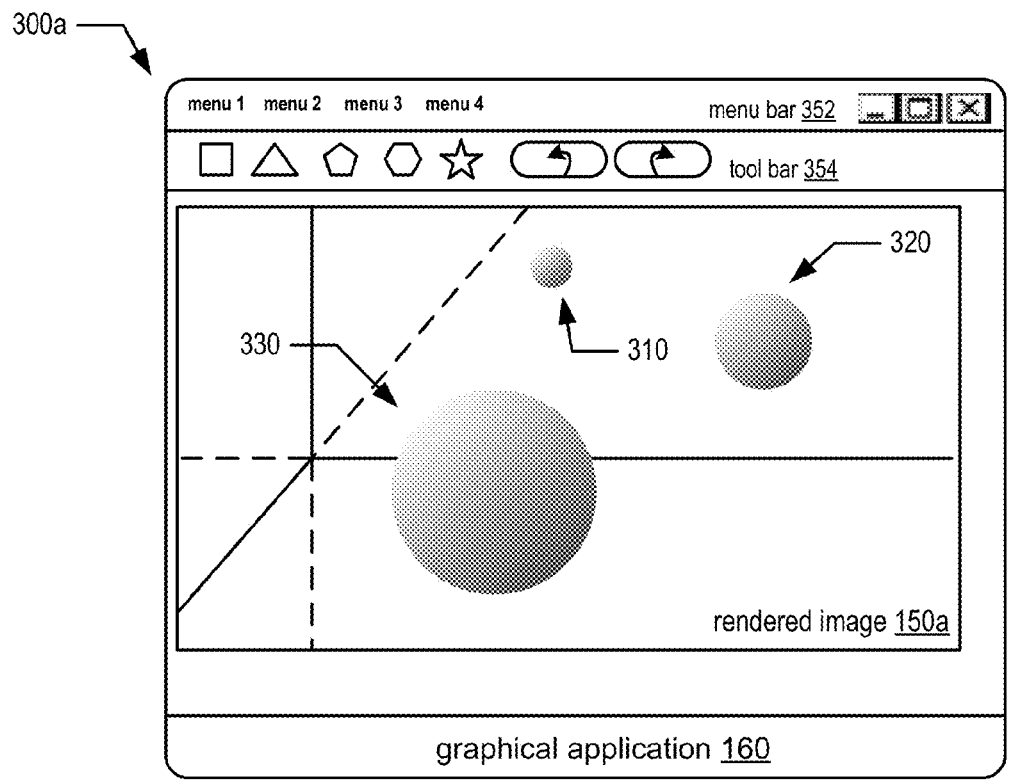
FIGS. 3A-3B include exemplary displays illustrating one example of a scene modification, according to some embodiments.
Figure 3B:
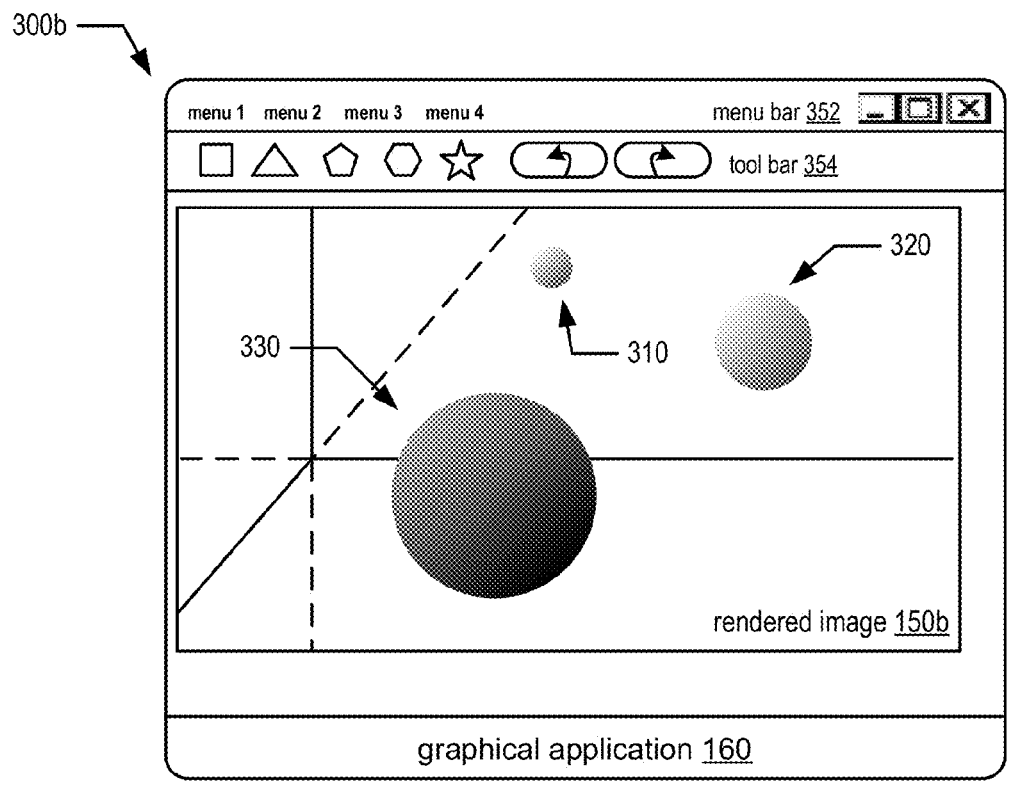

FIGS. 3A-3B illustrate the modification of a scene element in accordance with the illustrated operation of FIG. 2. As illustrated, FIGS. 3A and 3B illustrate exemplary displays 300*a* and 300*b* of graphical application 160. In the illustrated example, such displays may include a menu bar 352 and/or a tool bar 354, which may include various controls for providing instructions to graphical application 160. Note that application 160 is not limited to receiving instructions through a graphical user interface; in some cases, graphical application 160 may receive commands via a command line interface (CLI) or via a programmed script that includes one or more commands. Also note that rendered image 150a and rendered image 150b represent the like-numbered images of FIGS. 1, 2 and 4 described herein. The illustrated images include three scene elements, namely spheres 310, 320 and 330. In the illustrated embodiment, sphere 310 corresponds to display list node 112, sphere 320 corresponds to display list node 114, and sphere 330 corresponds to display list node 116. Note that the illustrated scene elements (e.g., spheres) are merely exemplary and any other type of scene element may be present in various other embodiments. In the illustrated example, displays 300a and 300b illustrate image 150 before and after application 160 performs operation 122 on display list node 116. In the illustrated example, operation 122 represents the modification of a surface color of scene element 330. Accordingly, graphical application 160 determines that display list node 116 (i.e., the display list node that corresponds to scene element 330) is to be modified. For example, to change a color of sphere 330, application 160 may change a value of a color attribute stored in display list node 116's dedicated portion of memory with a new value. As illustrated by display 300b, a rendered image 150b of the modified scene including sphere 330 colored according to its new color value (e.g., black) may be rendered from the modified display list. Note that such rendering may be performed without allocating additional memory for the display list and/or without modifying the scene graph. In some embodiments, the scene graph may be modified to reflect such a scene modification; however, such modification to the scene graph may be performed asynchronously with respect to the rendering process. In various embodiments, the scene graph may remain unchanged while a new image is rendered from a modified display list. Note that when a scene element is modified in a conventional system, such modification is typically performed by modifying the corresponding scene graph, generating a new display list, linking the new display list, and rendering from the new display list an image of the scene including the scene modification.

Returning to FIG. 2, the illustrated embodiment also includes an object manager 130 that may be notified of operation 122, as demonstrated by the illustrated change notification. For each change notification received (likewise, for each operation performed), object manager 130 may be configured to create a corresponding stored record of a history state, such as history states 132a-n. In various embodiments, history states 132a-n may each specify the state of a scene at a given point in time. For example, in various embodiments, each history state may correspond to a respective scene modification. For instance, a particular scene modification might include changing the color of a light element from red to green. The corresponding history state for such a scene modification may specify such color change.

In the illustrated example, object manager 120 may generate history state 132a in response to being notified of operation 122. For instance, history state 132a may be a record indicating a particular change in a particular attribute of a sphere 330. For the example of a color change to a sphere 330, the corresponding history state may include an identifier of the scene element (e.g., a pointer to the memory space in which display list node 116 resides), an identifier of a particular attribute that was changed (e.g., a color attribute), the value from which the attribute was changed (e.g., a color code corresponding to light grey), and/or the value to which the attribute was changed (e.g., a color code corresponding to black).

Figure 4:
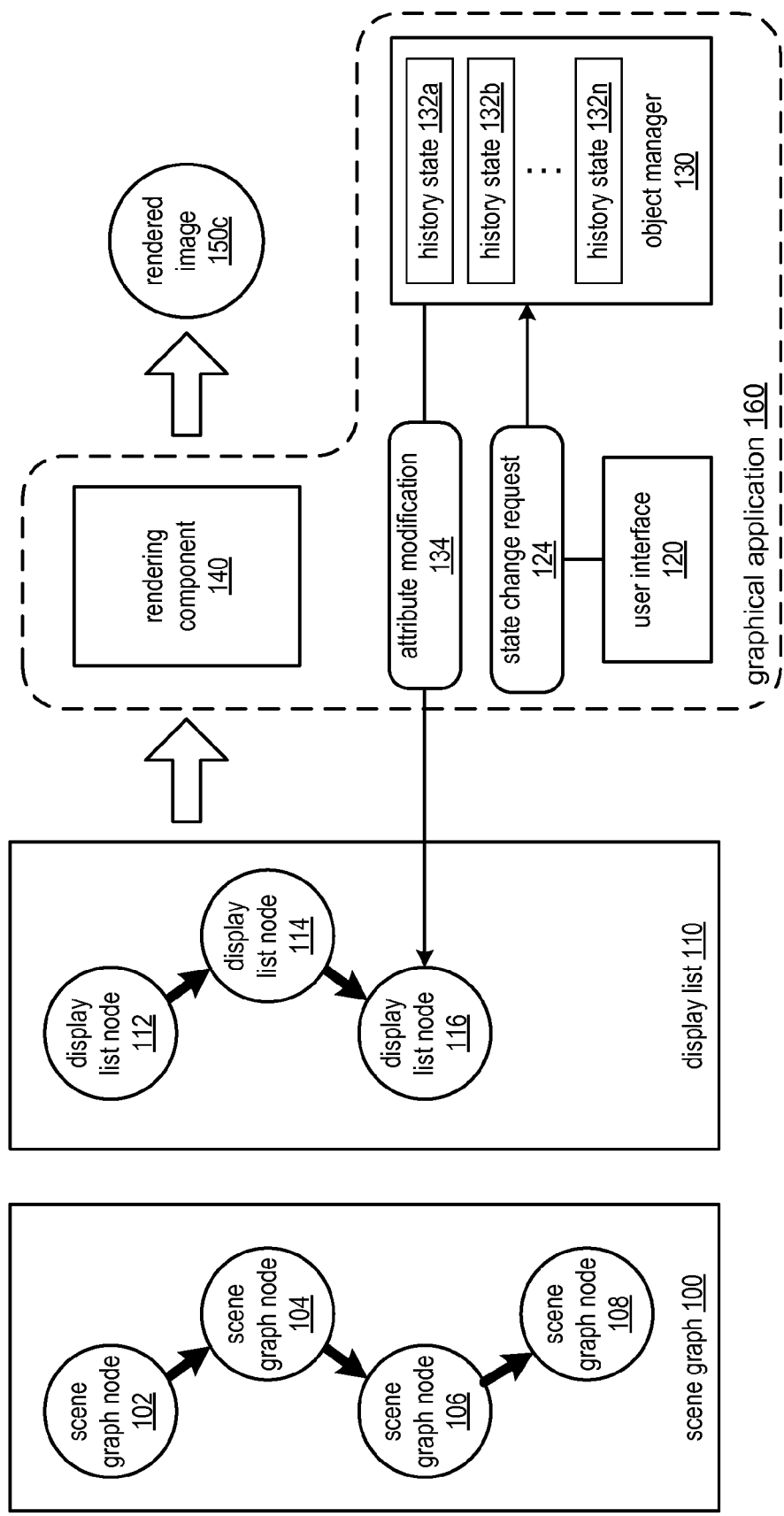
FIG. 4 illustrates the operation of elements of the method and system for modifying and rendering scenes via display lists during a state change, according to some embodiments.

FIG. 4 illustrates the operation of elements of the method and system for modifying and rendering scenes via display lists during a state change. Note that the description presented above with respect to elements of FIGS. 1 and 2 also applies to the like-numbered elements of FIG. 4. In various cases, the object manager may be responsive to requests to load a particular history state from history states 132a-n. In some embodiments, such requests may correspond to undo commands (e.g., a command to transition to a previous state) or redo commands (e.g., a request to transition to a future state). For instance, such requests may in some embodiments be submitted through a user-interface control, such as a control of tool bar 354 described above. In the illustrated embodiment, the request to change a state of the scene is illustrated as state change request 124. For example, state change request 124 may be a request to unload history state 132a and load a previous history state, such as history state 132b. To load history state 132b, graphical application 160 may modify a particular value of a particular display list node according to that history state. In the illustrated example, the graphical application may determine that history state 132a represents a change in color of sphere 330 from grey to black. Accordingly, to unload state 132a and load state 132b, the graphical application may be configured to perform attribute modification 134 on the respective display list node, namely display list node 116. More specifically, attribute modification 134 may include graphical application 160 replacing a value for a color attribute (e.g., a color code that specifies the color black) of history state 132a with a color attribute history state 132b (e.g., a color code that specifies the color gray). By replacing such attribute with a previous value, graphical application 160 may return display list 110 to the state in which it resided prior to the color change of sphere 330. Further, rendering component 140 may render image 150c of the scene from display list 110 when it resides in history state 132b. Image 150c may be equivalent to image 150a since both images are rendered without the application of history state 132a (which corresponds to the color change of scene element 330). In various cases, images rendered according to the same history state may be equivalent to one another. While various examples described herein refer to a change in color, various other attributes may be modified in various embodiments. For instance, attributes such as position, orientation, color, hue, saturation, contrast, white levels, texture, intensity (e.g., for light objects), light type, light position, light target, light color, hotspot angle, falloff angle, camera type, banking angle, lens type, aspect ratio (e.g., ratio of viewing frustum defined by camera), zoom factor, shadow attributes, texture attributes, mesh attributes and/or other attributes that may be represented as part of a three dimensional scene may be modified in various embodiments.

Figure 5:
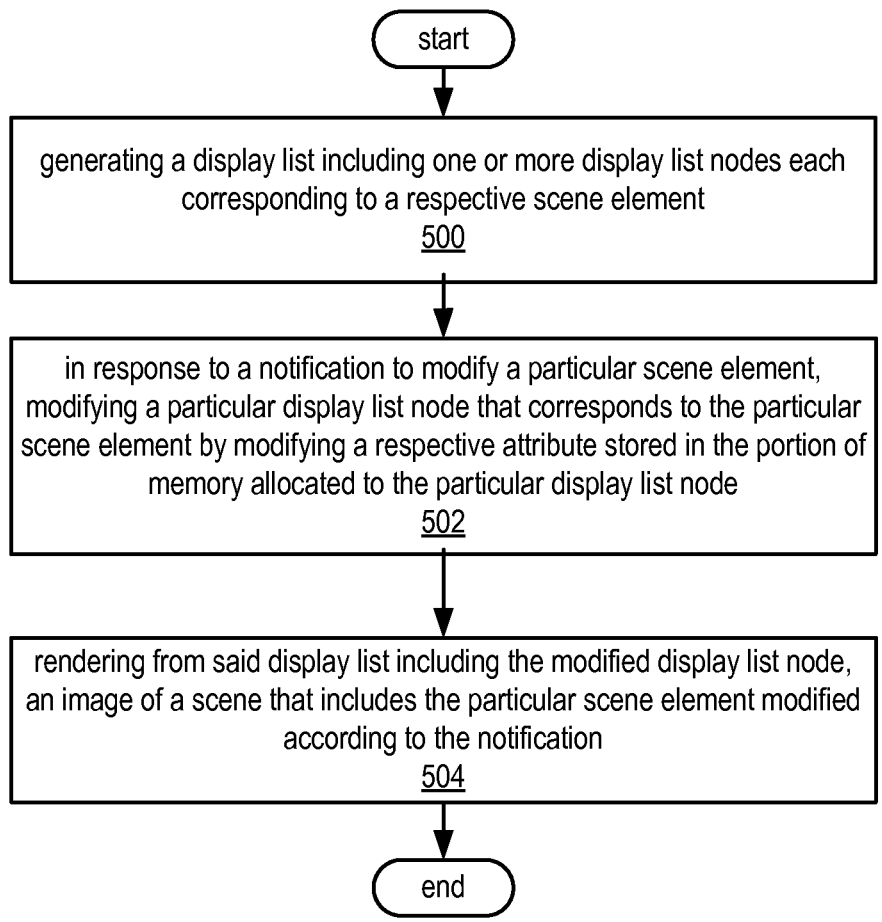
FIG. 5 illustrates a flowchart of an exemplary method for rendering an image of a scene from a display list, according to some embodiments.

The method and system for modifying and rendering scenes via display lists may include a variety of methods, some of which are described in more detail below. FIG. 5 illustrates a flowchart of one example of such methods, according to some embodiments. In various embodiments, the method described herein may be performed by graphical application 160 described above. As illustrated by block 500, the method may include generating a display list that includes one or more display list nodes each corresponding to a respective scene element. As described above, a display list may be an optimized version of a corresponding scene graph. Accordingly, such display list may also be represented by a tree data structure including one or more parent nodes and corresponding child nodes. In various embodiments, the method described herein may include generating a display list by excluding nodes for scene elements that are positioned outside of the view frustum (e.g., a view frustum defined by a camera object). In some embodiments, the method described herein may include generating a display list by excluding hidden nodes (i.e., nodes positioned within the view frustum that are not visible due to a viewing obstruction, such as a larger element in the scene). Generating a display list may in some embodiments include optimizing such display list by sorting faces of geometrical objects to minimize switching between different materials at render time in order to conserve processing time/power. In various embodiments, generating a display list may also include storing such display list in memory, such as RAM.

Figure 7:
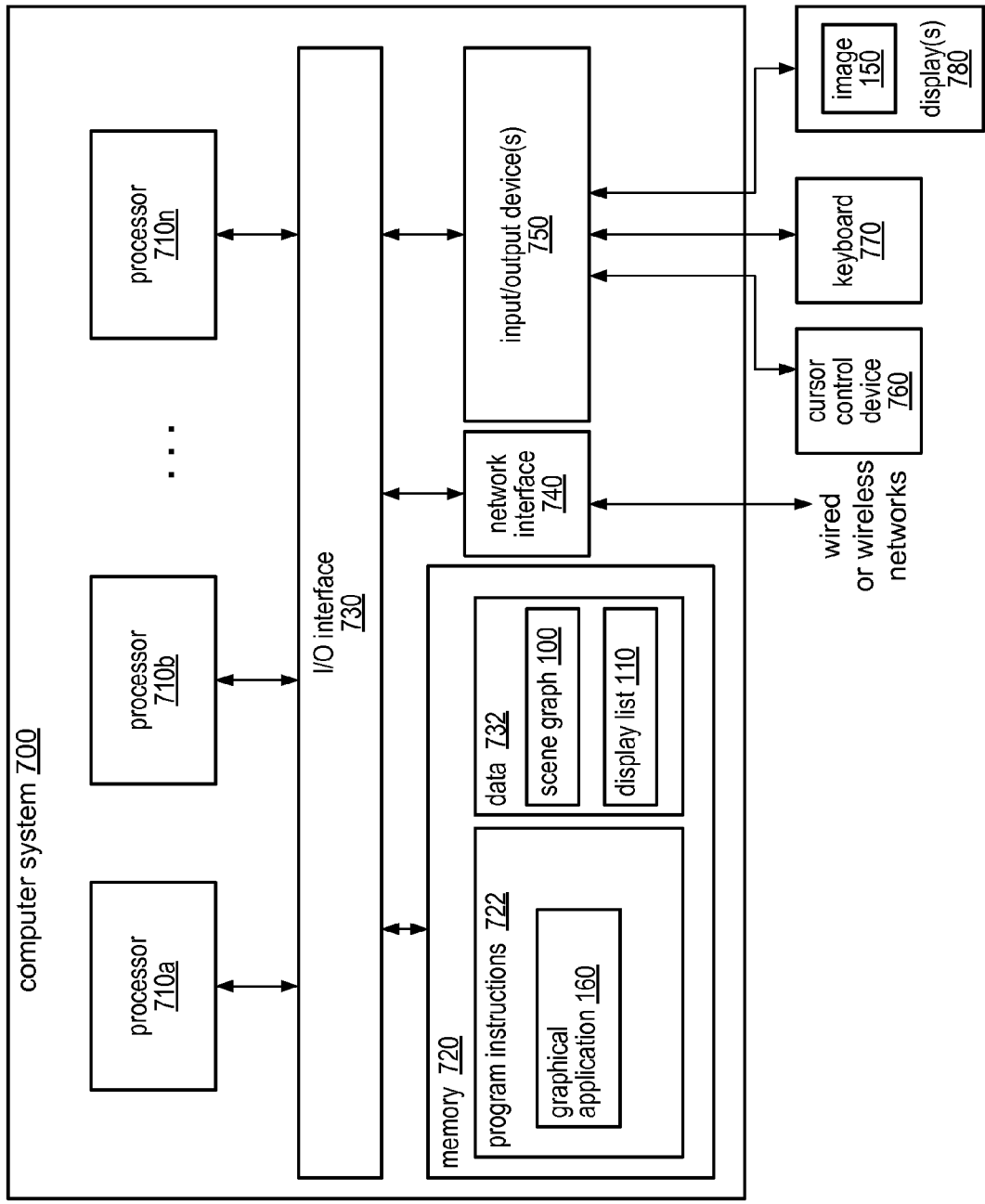
FIG. 7 illustrates a computing system suitable for implementing various elements of a method and system for modifying and rendering scenes via display lists, according to some embodiments.

To generate a given display list node of the display list, the method may include determining a particular scene graph node (of a scene graph) that specifies one or more attributes (e.g., color, position, orientation, or any other attribute described herein) of the respective scene element to which the given display list node corresponds. The method may further include allocating a portion of memory (e.g., a portion of memory 720 as illustrated in FIG. 7) dedicated to the given display list node. The method may also include storing (in that portion of memory) at least one of the one or more attributes of the respective scene element (e.g., as specified by the determined scene graph node).

As illustrated by block 502, the method may include, in response to a notification to modify a particular scene element, modifying a particular display list node that corresponds to the particular scene element by modifying a respective attribute stored in the portion of memory allocated to the particular display list node. To perform a modification to a scene element to which that particular display list node corresponds, the method may include replacing the value of an attribute stored in the display list node's dedicated portion of memory with a new value for the attribute. For example, to change a color of a particular scene element, a color code of a color attribute stored in the corresponding display list node's dedicated portion of memory may be replaced with a new color code. In other example, the method may include modifying a value associated with other attributes, such as values associated with position, orientation, color, hue, saturation, contrast, white levels, texture, intensity (e.g., for light objects), light type, light position, light target, light color, hotspot angle, falloff angle, camera type, banking angle, lens type, aspect ratio (e.g., ratio of viewing frustum defined by camera), zoom factor, shadow attributes, texture attributes, mesh attributes and/or values associated with other attributes that may be represented as part of a three dimensional scene.

As illustrated by block 504, the method may further include rendering (from the display list including the modified display list node) an image of a scene that includes the particular scene element modified according to the notification to modify the particular scene element. One example of such rendering is described above with respect to image 150b. In various embodiments, the method may include performing the rendering without allocating additional memory for the display list and/or without modifying the scene graph. In various embodiments, the scene graph may be modified to reflect such a scene modification (e.g., by modifying one or more attributes specified by said scene graph); however, such modification to the scene graph may be performed asynchronously with respect to the rendering process.

Figure 6:
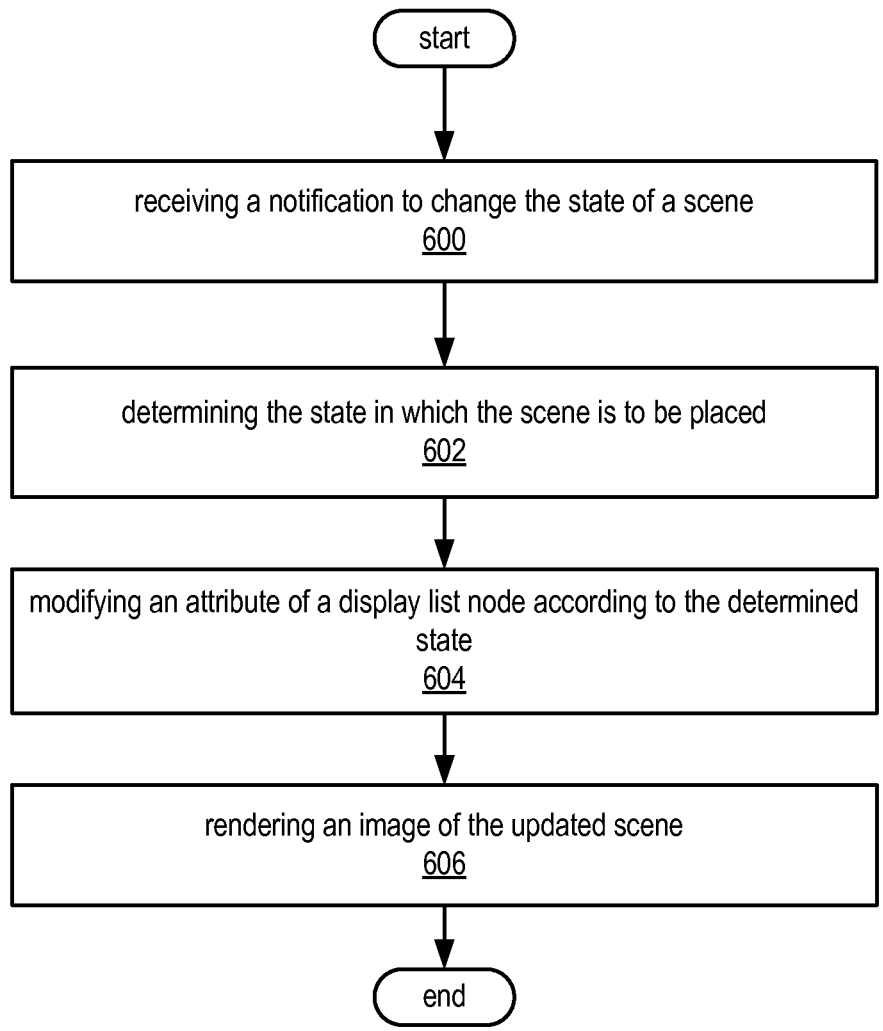
FIG. 6 illustrates a flowchart of an exemplary method for performing a history state change, according to some embodiments.

FIG. 6 illustrates a flowchart of an exemplary method for performing a history state change, according to some embodiments. In various embodiments, the method described herein may be performed by graphical application 160 and/or object manager 130 described above. As illustrated by block 600, the method may include receiving a notification to change the state of a three dimensional scene. One example of such a request is described above with respect to state change request 124. In some embodiments, such requests may correspond to undo commands (e.g., a command to transition to a previous state) or redo commands (e.g., a request to transition to a future state). For instance, such requests may in some embodiments be submitted through a user-interface control (e.g., such as described above with respect to controls of tool bar 354). As illustrated by block 602, the method may further include determining the state in which the scene is to be placed. For instance, in some embodiments, the notification to change the state of a scene may specify a previous state (e.g., such as might be the case for an undo action) a future state (e.g., such as might be the case for a redo action), or even a state identified by a particular time (e.g., a request to roll back all history state changes of the past 5 minutes or some other time period).

As illustrated by block 604, the method may further include modifying an attribute of a display list node according to the determined state. For example, the determined state may specify a particular value of a particular attribute of a display list node. The method may include replacing the current value stored in the portion of memory dedicated to that display list node with a value of the determined history state. One example of such a change is described above with respect to attribute modification 134. For instance, in the case of a color change, the method may include replacing a current color code stored in the portion of memory dedicated to a display list node with a color code specified by the determined history state. In various other embodiments, other attributes may be modified including but not limited to position, orientation, color, hue, saturation, contrast, white levels, texture, intensity (e.g., for light objects), light type, light position, light target, light color, hotspot angle, falloff angle, camera type, banking angle, lens type, aspect ratio (e.g., ratio of viewing frustum defined by camera), zoom factor, shadow attributes, texture attributes, mesh attributes and/or values associated with other attributes that may be specified by a history state. As illustrated by block 606, the method may further include rendering an image of the updated scene according to the various rendering methods described above. For example, the method may include rendering the updated scene without allocating additional memory for the display list and/or without modifying the scene graph.

Various embodiments of a method and system for modifying and rendering scenes via display lists, as described herein, may be executed on one or more computer systems, which may interact with various other devices. One such computer system is computer system 700 illustrated by FIG. 7. Computer system 700 may be capable of implementing a graphical application, such as graphical application 160. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780 for displaying images rendered according to the various techniques described above (e.g., image 150, which may represent any one of images 150a-c). In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing a graphical application, are shown stored within system memory 720 as graphical application 160. Additionally, data representing one or more scene graphs and one or more display lists are shown illustrated as scene graph 100 and display list 110. In various embodiments, program instructions and/or data may be stored upon different types of computer-readable storage media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems (e.g., server 160), or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 7, memory 720 may include program instructions 722 configured to implement a graphical application, such as graphical application 160, and data 732 including one or more scene graphs, such as scene graph 100, and one or more display lists, such as display list 110. In one embodiment, graphical application 160 may implement the methods described above, such as the methods illustrated by FIGS. 5 and 6. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on computer-readable storage media or a portable article to be read by an appropriate drive, various examples of said portable articles are described above. In some embodiments, instructions stored on a computer-readable storage media separate from computer system 700 may be transmitted to computer system 700 via transmission media or signals such as electrical, electromagnetic, or digital signals, conveyed via a communication medium such as a network and/or a wireless link. Various embodiments may further include receiving or sending or storing instructions and/or data implemented in accordance with the foregoing description upon a transmission medium. Accordingly, various embodiments may be practiced with other computer system configurations.

Various embodiments may further include storing instructions and/or data implemented in accordance with the foregoing description upon a computer-readable storage media. Generally speaking, a computer-readable storage media may include storage media or memory media such as magnetic or optical media, e.g., disk or DVD/CD-ROM, volatile or nonvolatile media such as RAM (e.g. SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. Various modifications and changes may be made as would be obvious to a person skilled in the art having the benefit of this disclosure.

Realizations in accordance with various embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of various embodiments as defined in the claims that follow.

What is claimed is:

1. A computer-implemented method comprising:
    generating a display list comprising one or more display list nodes, each display list node corresponding to a respective scene element of a scene graph that defines the position and orientation of multiple scene elements within a three-dimensional space, said display list defining a specific two-dimensional view of the three-dimensional space, the generating of a given display list node comprising:
        determining a particular scene graph node of the scene graph, the particular scene graph node specifying one or more attributes of the respective scene element to which the given display list node corresponds;
        allocating a portion of memory dedicated to the given display list node, said allocating performed at load time in response to loading of a source graphics file from which the scene graph is generated by a graphical application;
        storing in said portion of memory, at least one of said one or more attributes of the respective scene element;
    responsive to a notification to modify a particular scene element of the scene graph, modifying a particular display list node that corresponds to said particular scene element by modifying a respective attribute stored in the portion of memory previously allocated to the particular display list node;
    rendering from said display list, including the modified display list node, an image of a scene that includes said particular scene element modified according to said notification; and
    generating a first history state specifying a state of said display list prior to said notification to modify said particular scene element, and generating a second history state specifying a state of said display list subsequent to said modifying the particular display list node.

2. The method of claim 1, the rendering being performed without allocating additional memory for said display list.

3. The method of claim 1, the rendering being performed without modifying said scene graph.

4. The method of claim 1 further comprising asynchronously updating said scene graph with respect to said rendering, the updating of the scene graph comprising modifying one or more attributes specified by said scene graph.

5. The method of claim 1, further comprising replacing a first value for said respective attribute with a second value for said respective attribute, stored in the portion of memory allocated to the particular display list node, the first history state specifying said first value for said respective attribute, and the second history state specifying said second value for said respective attribute.

6. The method of claim 5 further comprising, responsive to a notification to change the state of said scene, transitioning the scene from said second history state to said first history state, the transitioning comprising replacing said second value stored as the value of said respective attribute with said first value.

7. The method of claim 6, further comprising, subsequent to said transitioning, rendering a different image of said scene that includes said particular scene element that was modified, the rendering of that particular scene element is being performed according to the value for said respective attribute specified by said first history state.

8. A system comprising:
    one or more processors; and
    a memory coupled to the one or more processors, the memory comprising instructions executable by the one or more processors to:
        generate a display list comprising one or more display list nodes, each display list node corresponding to a respective scene element of a scene graph that defines the position and orientation of multiple scene elements within a three-dimensional space, said display list defining a specific two-dimensional view of said the three-dimensional space, the instructions to generate a given display list node, are configured to:
            determine a particular scene graph node of the scene graph, the particular scene graph node specifying one or more attributes of the respective scene element to which the given display list node corresponds;
            allocate a portion of memory dedicated to the given display list node, said allocating performed at load time when a source graphics file from which the scene graph is generated is loaded by a graphical application;
            store in said portion of memory, at least one of said one or more attributes of the respective scene element;
        responsive to a notification to modify a particular scene element of the scene graph, modify a particular display list node that corresponds to said particular scene element by modifying a respective attribute stored in the portion of memory previously allocated to the particular display list node;
        render from said display list including the modified display list node, an image of a scene that includes said particular scene element modified according to said notification; and
        generate a first history state specifying a state of said display list prior to said notification to modify said particular scene element, and generate a second history state specifying a state of said display list subsequent to said modifying the particular display list node.

9. The system of claim 8, the instructions being configured to render said image without allocating additional memory for said display list.

10. The system of claim 8, the instructions being configured to render said image without modifying said scene graph.

11. The system of claim 8, the instructions being configured to asynchronously update said scene graph with respect to said rendering, by modifying one or more attributes specified by said scene graph.

12. The system of claim 8, the instructions being configured to modify the respective attribute stored in the portion of memory allocated to the particular display list node by replacing a first value for said respective attribute with a second value for said respective attribute, the first history state specifying said first value for said respective attribute, and the second history state specifying said second value for said respective attribute.

13. The system of claim 12, the instructions being configured to, to a notification to change the state of said scene, transition the scene from said second history state to said first history state, by replacing said second value stored as the value of said respective attribute with said first value.

14. The system of claim 13, the instructions being configured to, subsequent to said transitioning, render a different image of said scene that includes said particular scene element that was modified, the rendering of that particular scene element being performed according to the value for said respective attribute specified by said first history state.

15. One or more computer-readable storage media having stored thereon multiple instructions, that in response to execution by one or more processors, cause the one or more processors to:
   generate a display list comprising one or more display list nodes, each display list node corresponding to a respective scene element of a scene graph that defines the position and orientation of multiple scene elements within a three-dimensional space, said display list defining a specific two-dimensional view of the three-dimensional space, the instructions to generate a given display list node are configured to:
     determine a particular scene graph node of the scene graph, the particular scene graph node specifying one or more attributes of the respective scene element to which the given display list node corresponds;
     allocate a portion of memory dedicated to the given display list node, said allocating performed at load time in response to loading a source graphics file from which the scene graph is by a graphical application;
     store in said portion of memory, at least one of said one or more attributes of the respective scene element;
   responsive to a notification to modify a particular scene element of the scene graph, modify a particular display list node that corresponds to said particular scene element by modifying a respective attribute stored in the portion of memory previously allocated to the particular display list node;
   render from said display list including the modified display list node, an image of a scene that includes said particular scene element modified according to said notification; and
   generate a first history state specifying a state of said display list prior to said notification to modify said particular scene element, and generate a second history state specifying a state of said display list subsequent to said modifying the particular display list node.

16. The one or more computer-readable storage media of claim 15, the instructions being configured to render said image without allocating additional memory for said display list.

17. The one or more computer-readable storage media of claim 15, the instructions being configured to render said image without modifying said scene graph.

18. The one or more computer-readable storage media of claim 15, the instructions being configured to asynchronously update said scene graph with respect to said rendering, by modifying one or more attributes specified by said scene graph.

19. The one or more computer-readable storage media of claim 15, the instructions being configured to modify the respective attribute stored in the portion of memory allocated to the particular display list node by replacing a first value for said respective attribute with a second value for said respective attribute, the first history state specifying said first value for said respective attribute, and the second history state specifying said second value for said respective attribute.

20. The one or more computer-readable storage media of claim 19, the instructions being configured to, responsive to a notification to change the state of said scene, transition the scene from said second history state to said first history state, by replacing said second value stored as the value of said respective attribute with said first value.

21. The one or more computer-readable storage media of claim 20, the instructions being configured to, subsequent to said transitioning, render a different image of said scene that includes said particular scene element that was modified, the rendering of that particular scene element being performed according to the value for said respective attribute specified by said first history state.

* * * * *

UNITED STATES PATENT AND TRADEMARK OFFICE
CERTIFICATE OF CORRECTION

PATENT NO.         : 8,441,496 B1                                          Page 1 of 1
APPLICATION NO.    : 12/242537
DATED              : May 14, 2013
INVENTOR(S)        : Mark Maguire It is certified that error appears in the above-identified patent and that said Letters Patent is hereby corrected as shown below:

In the Claims

Column 14, Line 17, Claim 7, insert -- is -- between "element" and "being", therefor.

Column 14, Line 22, Claim 8, delete "a" before "memory coupled to the...", therefor.

Column 14, Line 30, Claim 8, delete "said" after "two-dimensional view of", therefor.

Column 15, Line 14, Claim 13, insert -- responsive -- between "...configured to," and "to a notification...", therefor.

Column 15, Line 43, Claim 15, insert -- loaded -- between "...scene graph is" and "by a graphical...", therefor.

Signed and Sealed this
Twenty-ninth Day of October, 2013

Teresa Stanek Rea
*Deputy Director of the United States Patent and Trademark Office*